United States Patent

[11] 3,533,436

| [72] | Inventor | Richard G. Parkison<br>Louisville, Kentucky |
|---|---|---|
| [21] | Appl. No. | 796,139 |
| [22] | Filed | Feb. 3, 1969 |
| [45] | Patented | Oct. 13, 1970 |
| [73] | Assignee | American Standard Inc.<br>New York, New York<br>a corporation of Delaware |

[54] SINGLE-CONTROL MIXING FAUCET AND VALVE FOR USE THEREIN
38 Claims, 11 Drawing Figs.

[52] U.S. Cl. .................................... 137/359,
137/375, 137/454.6, 137/625.4, 137/636.3, 251/172
[51] Int. Cl. .................................... F16l 5/00
[50] Field of Search .................................... 137/454.6, 375, 359, 636.3, 636.2, 625.4, 625.17; 251/170, 171, 172

[56] References Cited
UNITED STATES PATENTS

| 2,202,735 | 5/1940 | Johnson | 137/375 |
| 2,977,986 | 4/1961 | Hinderer | 137/625.4X |
| 3,035,612 | 5/1962 | Lyon | 137/636.2X |
| 3,232,308 | 2/1966 | Moen | 137/119 |
| 3,324,884 | 6/1967 | Dornaus | 137/625.17 |

*Primary Examiner*—Harold W. Weakley
*Attorneys*—Robert G. Crooks, Tennes I. Erstad and Sheldon H. Parker

ABSTRACT: This mixing faucet is especially adapted for controlling both the temperature and the rate of flow of water delivered from a pair of water lines to a sink or lavatory. The faucet incorporates a valve which may take the form of a "cartridge" for easy removal and repair. The valve cartridge includes a pair of plates of material such as a very hard ceramic, one of said plates having a control recess and being slidable across the other of said plates, which incorporates inlet and outlet ports. The slidable plate has at one edge thereof an enlongated portion which is guided by structure in the body of the valve. The slidable plate is actuated by an arm having a protuberance which cooperates with a depression in the plate without applying twisting force to the plate.

INVENTOR.
Richard G. Parkison

INVENTOR.
Richard G. Parkison

ATTORNEY

INVENTOR.
Richard G. Parkison

BY

ATTORNEY

INVENTOR.
Richard G. Parkison
ATTORNEY

SINGLE-CONTROL MIXING FAUCET AND VALVE FOR USE THEREIN

CROSS REFERENCE TO RELATED INVENTIONS

The mixing faucet and valve in accordance with the present invention represent improvements of the faucet and valve disclosed and claimed in my copending application Ser. No. 698,830, filed on Jan. 18, 1968, which is in turn a continuation-in-part of my application Ser. No. 423,534, filed on Jan. 1, 1965, now abandoned.

BACKGROUND OF THE INVENTION

In recent years, it has been recognized that there is often no necessity to employ two separate faucets to deliver hot and cold water, respectively, to a sink or lavatory. Rather, hot and cold water have for a number of years been mixed in the desired ratio in a mixing faucet and delivered to the sink or lavatory from a single spout at the desired temperature and with the desired rate of flow. Mixing faucets of this type should be controllable by a single handle or lever, the motion of which sets both the desired rate of flow and the desired temperature of the water issuing from the faucet. Mixing faucets having a single control handle or lever are often disposed on the deck of a sink or lavatory so that motion of the handle in one direction, such as the fore-and-aft direction, controls the rate of flow, whereas motion of the handle in a direction perpendicular to the first-named direction controls the temperature of the water. Thus, mixing faucets of this type are sometimes arranged so that side-to-side motion of the actuating handle or lever controls the temperature of the water discharged into the sink or lavatory. In accordance with the convention governing the arrangement of traditional types of faucets, mixing faucets are often arranged so that motion of the handle to the left causes hot water to flow, while motion of the handle to the right causes cold water to flow.

Mixing faucets of the type just described sometimes incorporate a mixing valve which is packaged in the form of a "cartridge" so that it may be removably attached to the body of the mixing faucet within the decorative structure of the faucet. Valve cartridges of this type have been provided which include a hollow valve body in which are formed respective openings for entry of hot and cold water from the body of the faucet and an opening through which the desired mixture of water may be returned from the valve cartridge to the body of the faucet for discharge through a spout into a sink or lavatory. A valve seat has been provided within the valve body and has included ports corresponding to the openings in the valve body. A valve plate has also been provided and has been arranged for slidable contact with the valve seat. The valve plate includes either a recess in its surface adjacent the valve seat or ports therethrough which can be disposed to cooperate with corresponding ports in the valve body to admit water from the lines for mixing purposes.

In these mixing valves of the prior art, it has sometimes been necessary to use an excessively large valve cartridge in order to achieve a sufficient rate of flow of water into the valve cartridge and back to the body of the faucet. This difficulty has been attributable to the limited space within the cartridge to accommodate sliding motion of the valve plate. This space limitation has also limited the cross-sectional size of the ports which could be accommodated within the valve seat and valve plate, and has consequently limited the maximum rate of flow of water through the valve.

Another problem characterizing prior-art valve cartridges has been the presence of external valve-actuating mechanism outside the body of the valve cartridge. Such mechanism has presented recesses which might catch and retain foreign material, thereby interfering with the actuation of the valve.

A further problem which has characterized some valves of the prior art has been their noisiness of operation. Some of this noisiness has been attributable to the rush of water which occurs when the inlet ports are suddenly opened, thereby permitting water to pass through a mixing chamber to the outlet port at greatly reduced pressure and without restraint by any part of the valve structure.

A still further problem with mixing valves of the prior art has been caused by torsional stresses in the slidable valve plate which have sometimes caused the valve plate to be damaged. Such torsional stresses have sometimes been caused by an actuating member which is keyed to the valve plate in such a way that rotation of the actuating member also forces the valve plate to rotate, even though such rotational motion of the valve plate is resisted to some extent by the friction between the surface of the valve plate and the surface of the valve seat.

Accordingly, it is an object of my invention to provide a mixing faucet equipped with a removable mixing-valve cartridge which is compact in size and yet which permits a sufficiently great rate of flow of water therethrough to allow a single size of valve cartridge to cover a wide range of rates of water flow.

It is another object of my invention to provide a mixing-valve cartridge which has only a minimum amount of structure extending outside the body of the valve cartridge and which, hence, is unlikely to be fouled by substances which may fall onto the valve cartridge.

It is a further object of my invention to provide a mixing faucet and valve cartridge which operate as quietly as possible, even during initiation of flow of water through the valve and faucet.

It is a still further object of my invention to provide a mixing valve in which the movable valve plate is not likely to be damaged by the mechanism which actuates said plate.

SUMMARY OF THE INVENTION

Briefly, I have fulfilled the above-listed objects, and other objects of my invention, by providing a mixing valve in which the movable valve plate and the fixed valve seat have mating operating surfaces which are lapped so smooth and flat that water cannot leak between them. Such lapped operating surfaces can be produced on ceramic materials such as fired aluminum oxide. In the operating surface of the movable valve plate is formed a depression which cooperates with ports that penetrate the valve seat. The depression preferably takes the form of a "moat" surrounding a raised "land." Water entering the valve through inlet ports in the valve seat is mixed within the moat-shaped recess and is returned at a desired temperature through an output port in the valve seat. Relative exposure of the recess to the respective input ports for hot and cold water regulates the temperature of the mixture. The total exposure of the recess in the valve plate to the input ports in the valve seat controls the total rate of flow through the valve.

The valve plate has at one edge thereof an elongated and relatively narrow portion, or "tail," which is guided between a pair of guide surfaces set in the valve body. Motion of the valve plate is achieved by means of an actuating arm which terminates in a substantially round protuberance that fits into a depression in the surface of the valve plate opposite the surface that slides on the valve seat. Bearing means are provided for the actuating arm in order to permit limited rotation and rocking motion of the actuating arm. The cross section of the depression formed in the valve plate and which receives the protuberance on the actuating arm is substantially circular.

The actuating arm and the valve plate are prevented from damaging each other by a protective surface interposed between them, said surface containing a lubricant if desired. The inner surface of the recess in the valve plate has a "stepped" configuration in order to minimize sudden changes in direction of flow of water and to minimize noise generation. The ports in the valve seat and the recess in the valve plate have a relationship such that the inlet ports permitting water to flow through the valve seat into the recess in the valve plate open simultaneously with the outlet port through which water leaves the recess and reenters the valve seat.

When the valve plate is in such a position as to prevent flow of water through the valve, the guide surfaces provided within the valve body prevent the "tail" of the valve plate from undergoing useless motion such as to require space within the valve body.

For a full understanding of my invention, reference should now be made to the following complete description of the preferred embodiment of the invention, taken in conjunction with the appended claims and the attached drawings.

DESCRIPTION OF THE PREFERRED EMBODIMENT

Figure 1:
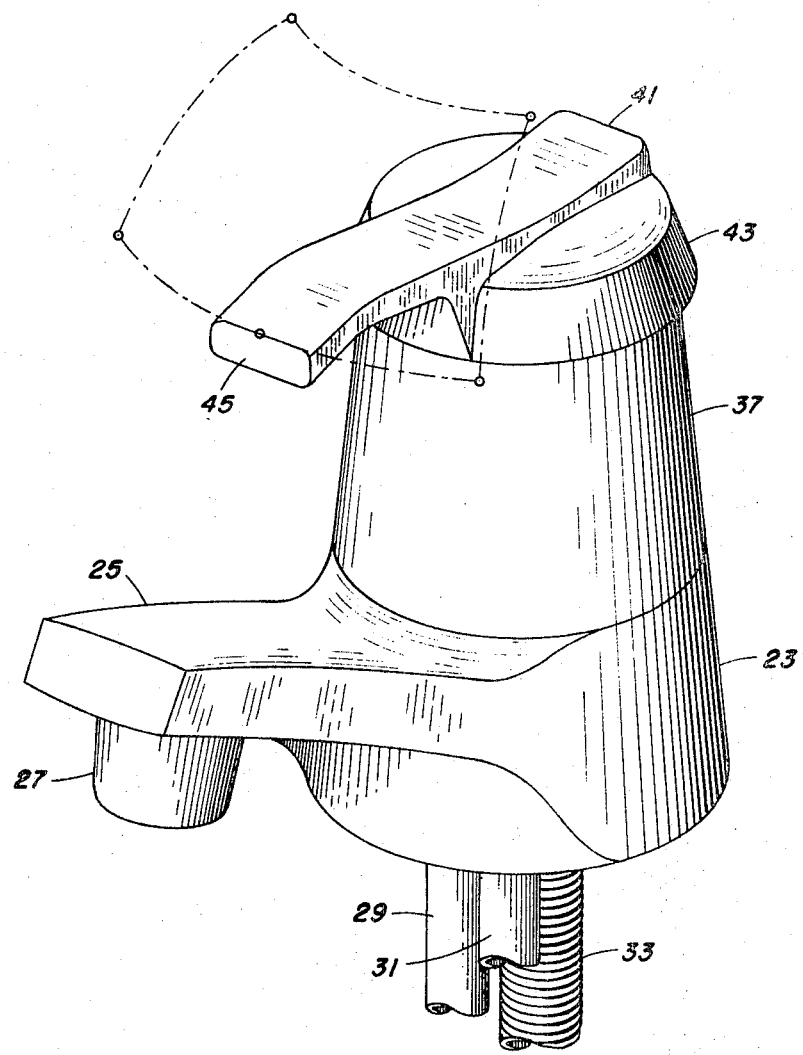
FIG. 1 is a perspective view of an assembled mixing faucet according to my invention and incorporating therein a mixing valve according to my invention.
Figure 3:
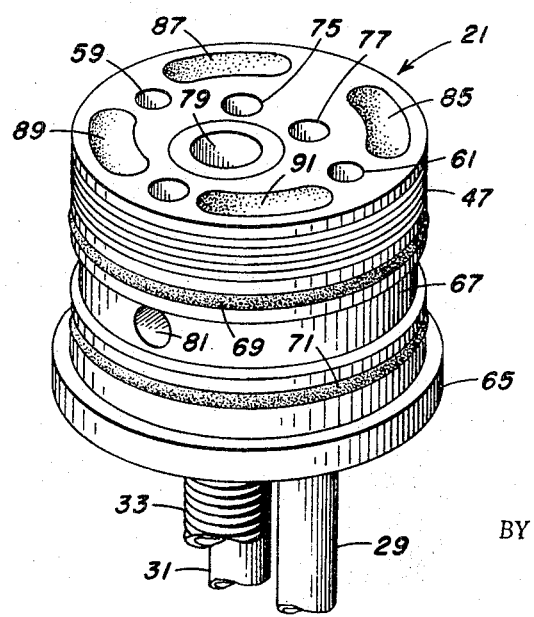
FIG. 3 is a perspective view of the body of the mixing faucet, upon the top surface of which the mixing valve of FIG. 2 is to be removably mounted.

Turning to FIG. 1 of the drawings, we see the assembled mixing faucet in condition to be mounted on the deck of a sink or lavatory. The body 21 of the faucet, as shown in FIG. 3 of the drawings, is concealed within a decorative spout 23 which slides down over body 21 in order to conceal it from view when the faucet is in operation. The spout has an elongated portion 25, extending to the left in FIG. 1, and may carry near its end an aerator 27 through which water is delivered from the spout to the basin of the sink or lavatory.

Water is delivered from the supply lines to the faucet through a first tube 29 and a second tube 31, one of which may accommodate the supply of hot water while the other accommodates the supply of cold water. Plumbers often follow the convention of disposing the supply pipes so that the hot water pipe is on the left and the cold water pipe is on the right as one faces the faucet across the basin of the sink or lavatory. A pipe 33 extends downwardly from the base of the body of the faucet and may serve a dual purpose. The first purpose which pipe 33 serves is to hold the faucet in place on the deck of the sink or lavatory. The outer surface of pipe 33 may be threaded to receive a washer and a nut, the nut being screwed up close to the lower side of the deck in order to confine the deck between the washer and the base of the faucet body, thereby retaining the faucet firmly in place on the upper surface of the deck.

If desired, pipe 33 may also constitute an outlet from the faucet body which may be connected to a hose leading to a sprayhead. Such a sprayhead, of course, is a useful adjunct of a lavatory for shampooing purposes and of a sink for dishwashing purposes.

If pipe 33 is to serve as an outlet from the faucet as well as serving to secure the faucet in place on the deck, it is necessary to provide within the body 21 of the faucet a diverter valve which determines whether water from the mixing valve is delivered through spout 23, or through pipe 33 to the hose and thence to the sprayhead. Inasmuch as such a diverter valve does not constitute one of the novel features of the present invention, no further attention will be devoted to such diverter valve. Rather, it will be assumed for the purposes of this disclosure that water is to be delivered through spout 23 rather than through pipe 33.

Figure 2:
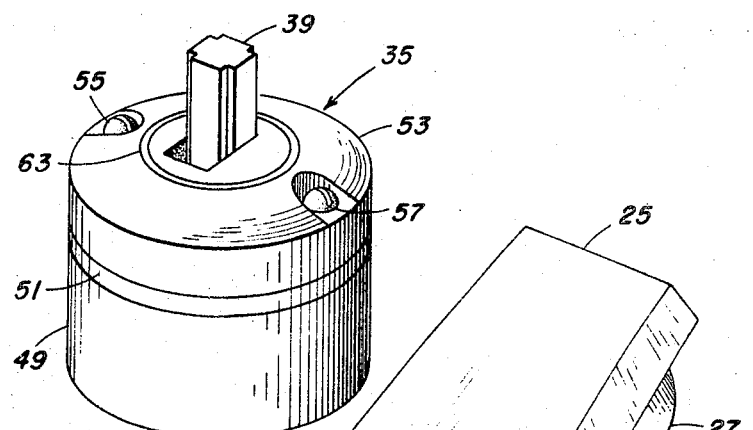
FIG. 2 is a perspective view of the mixing valve or mixing-valve "cartridge" according to my invention.
Figure 4:
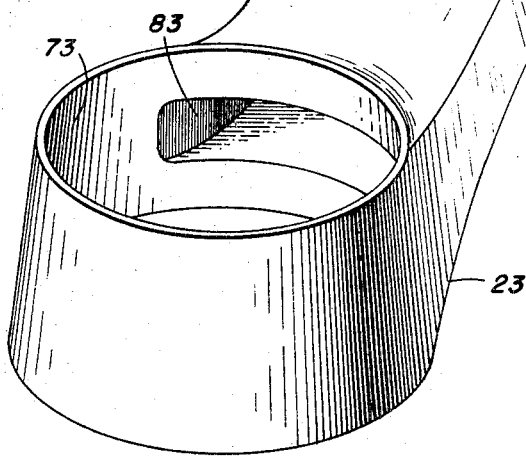
FIG. 4 is a perspective view of the spout of the mixing faucet and which may be slipped down over the faucet body shown in FIG. 3, thereby permitting the valve of FIG. 2 to be set in place on the faucet body of FIG. 3.

In the perspective view of FIG. 1, the mixing valve 35, as illustrated in FIG. 2, is concealed within a decorative escutcheon 37 which has an opening at its top. Means for actuating the mixing valve, such as an actuating arm 39, extends upward through said opening and carries at its upper end a handle structure 41 which may include a round portion 43 and a forwardly extending portion 45 to be gripped by the operator of the faucet. Handle structure 41 may have within it a downwardly extending collar which receives the end of actuating arm 39 and holds it firmly.

The materials of the aforementioned parts should be strong, durable and resistant to corrosion, but are otherwise not critical. Spout 23 may be formed from cast brass which has been machined smooth and plated with nickel and subsequently with chromium to achieve a permanent rustproof finish. Aerator 27 may comprise a combination of screen structures for preventing splashing of water delivered from the spout to the basin of the sink or lavatory. The aerator may make provision for introduction of air from the side of the aerator into the stream of water passing therethrough. First tube 29 and second tube 31 may be formed of copper or some other rather flexible rustproof metal, whereas pipe 33 may be formed of brass or any equivalent strong and noncorrodible material. Decorative escutcheon 37 may be made of brass smoothly finished and plated with nickel and chromium. The inside lower edge of decorative escutcheon 37 may be threaded to cooperate with threads 47 at the top of the outer surface of body 21 of the faucet, thereby holding decorative escutcheon 37 in place on body 21 after spout 23 and mixing valve 35 are in place on body 21. Handle structure 41 may be a zinc die casting plated with chromium in order to give it an attractive finish. It will be understood that all of the materials just mentioned are exemplary only and are not to be taken in any limiting sense.

Reference to FIG. 2 of the drawings shows that mixing valve 35 is generally cylindrical in shape, and that actuating arm 39 extends upwardly through the top surface of mixing valve 35. Mixing valve 35 includes a valve body 49, upon which are mounted a support cap 51 and a top cap 53. Both support cap 51 and top cap 53 are retained in place by means of a pair of cap screws 55 and 57, or other suitable fasteners, which extend downwardly through passageways in the mixing-valve structure and may enter suitably threaded holes 59 and 61 in the top surface of faucet body 21. Thus, cap screws 55 and 57 retain the mixing valve in position on faucet body 21 and resist the force attributable to the pressure of water supplied through faucet body 21. Actuating arm 39 may have a cross section and surface such that handle structure 41 may be retained in place on the end of the arm by frictional and gravitational forces. Actuating arm 39 may be formed from extruded brass or stainless steel stock, which may be generally square in cross section, with the corners removed during the extrusion process. The lower end of actuating arm 39, and the structure which supports it in place in the mixing valve, will be described later.

Top cap 53 has a passageway 63 therethrough for accommodation of actuating arm 39 and its supporting structure. In my preferred embodiment of the mixing valve, passageway 63 allows actuating arm 39 to assume a position along the central axis of top cap 53, and to rock away from said central axis in one direction. As will be pointed out later in the specification, such rocking of actuating arm 39 away from the central axis brings about opening of the mixing valve so that fluid can flow therethrough.

So far as materials for the mixing valve are concerned, there is again a rather wide latitude of choice. I prefer to form valve body 49 of a material such as glass-filled styrene acrylonitrile. This is a high quality plastic material which may be easily molded and which may be colored if desired. The glass filling in the material provides additional strength by virtue of its reinforcing qualities.

I also prefer to form top cap 53 from glass-filled styrene acrylonitrile although, once again, any suitable material might be used for this purpose. I have found that a plain styrene acrylonitrile without glass reinforcement is suitable for the structure of support cap 51, which is molded in a rather intricate configuration, and which does not require extra reinforcement. The intricacies of the configuration of support cap 51 are shown more clearly in FIGS. 6 and 8 of the drawings.

Returning to FIG. 3 of the drawings, it will be noted that faucet body 21 is formed roughly in the shape of a cylinder and that it may have a mounting flange 65 at its base which extends outward from the generally cylindrical surface of body 21. The generally cylindrical surface of body 21 is also interrupted at approximately the midpoint of the height of the body by a groove 67 which circles the faucet body. The generally cylindrical surface is also modified by a pair of channels either side of groove 67, which may accommodate O-rings 69 and 71, which bear against the inner surface 73 of spout 23 when the spout is assembled around faucet body 21.

It may be helpful at this point to trace the flow of water through the faucet and the mixing valve when the faucet and valve are assembled together. Once again, no attention will be paid to the fact that many mixing faucets of this type are equipped with diverter valves within the faucet body to permit water to be directed either through the spout or through a hose and sprayhead.

Water entering faucet body 21 from first tube 29 or second tube 31 or both passes up through openings 75 and 77 in the upper surface of body 21 and enters mixing valve 35, which is secured to the top of faucet body 21 by means of cap screws 55 and 57 or equivalent fasteners. If the mixing valve is open, water from the mixing valve returns to faucet body 21 through exit opening 79, which conducts the water through a slot into the interior of faucet body 21. The water emerges from the interior of faucet body 21 through an aperture 81 in groove 67, which circles faucet body 21. The water is prevented from leaking upwardly or downwardly out of groove 67 by virtue of the seal formed between O-rings 69 and 71 and inner surface 73 of spout 23. The water is thus forced to flow from aperture 81 through groove 67 to an entry 83 in spout 23. Then, of course, the water flows out through elongated portion 25 of spout 23 and is delivered through aerator 27 if such an aerator is employed.

In order to lighten slightly the structure of faucet body 21, I prefer to leave recesses 85, 87, 89, and 91 in its upper surface, thereby reducing somewhat the requirement for metal or other material in forming faucet body 21. The upper surface of faucet body 21 may be referred to as the "manifold" of the faucet body. The manifold of the faucet body must mate with a similar manifold in the base of mixing valve 35 without permitting leakage of fluid between faucet body 21 and mixing valve 35. The nature of the relationship between these two manifolds and of the seal which exists between them will be described in discussing the remaining figures of the drawings.

Figure 6:
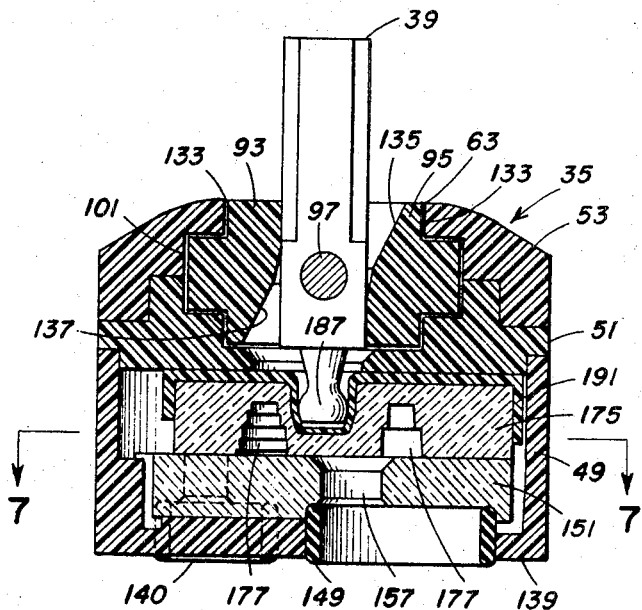
FIG. 6 is a sectional view of the mixing valve of FIG. 5, taken on a plane passing along the axis of the mixing valve through the line 6–6 in FIG. 5.
Figure 5:
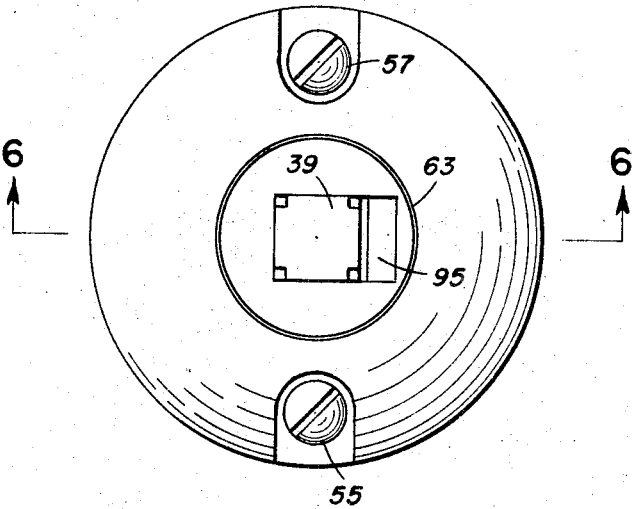
FIG. 5 is a top view of the mixing valve of FIG. 2, the valve being shown in a setting such that fluid is prevented from flowing through it.

Turning now to FIG. 5 of the drawings, we note that actuating arm 39 of the mixing valve is in this view disposed along the axis of the mixing valve, as shown more clearly in FIG. 6. This position of actuating arm 39 along the axis of the mixing valve corresponds to the "off" position of the valve. In order to turn the valve "on," the end of actuating arm 39 as seen in FIG. 5 may be rocked somewhat to the right. Rocking motion to the right is permitted because passageway 63 through top cap 53 has a diameter sufficient to permit such motion of actuating arm 39.

Actuating arm 39 is carried by a bearing structure 93 having a passageway 95 therethrough for reception of actuating arm 39. Bearing structure 93 supports actuating arm 39 by means of a pivot pin 97 which penetrates actuating arm 39 and has its ends set in diametrically opposed holes in bearing structure 93. Pivot pin 97 may be of a metal such as brass or stainless steel, and may have a series of splines or grooves 99 formed in the surface of its central portion and oriented in an axial direction. When pivot pin 97 is forced through bearing structure 93 and actuating arm 39, grooves 99 are sufficiently deformed within the hole passing through actuating arm 39 to retain pivot pin 97 in place.

So far as the material of bearing structure 93 is concerned, I have found that a satisfactory bearing structure may be formed from a high-grade engineering plastic such as reinforced Acetal. This material is offered on the market under the trademark "CELCON" by Celanese Corporation of America and under the trademark "DELRIN" by E.I. duPont de Nemours & Company. The pivot pin 97 is free to turn within the diametrically opposed holes in bearing structure 93, but is retained for no relative motion between pivot pin 97 and actuating arm 39. Once again, there is wide latitude for choice of materials and of such features as the mode of suspension of actuating arm 39 in bearing structure 93.

Bearing structure 93 is supported for limited rotational motion in a race 101 jointly defined by the inner surfaces of support cap 51 and of top cap 53. Bearing structure 93 is provided with a pair of outwardly extending "ears" 103 and 105 which are located in positions diametrically opposed to each other on a cylindrical surface 107 which circles the equatorial portions of bearing structure 93. These ears are shown clearly in FIG. 8 of the drawings. Ears 103 and 105 extend into respective slots 109 and 111 as defined jointly by top cap 53 superposed upon support cap 51. The rotational motion of bearing structure 93 with respect to support cap 51 and top cap 53 is limited when ear 103 strikes the stops 113 and 115 respectively on support cap 51 and top cap 53, or stops 117 and 119 respectively on support cap 51 and top cap 53. Likewise, the rotational motion of bearing structure 93 with respect to support cap 51 and top cap 53 is limited when ear 105 of bearing structure 93 strikes stops 121 and 123 respectively on support cap 51 and top cap 53, or stops 125 and 127 respectively on support cap 51 and top cap 53.

Figure 8:
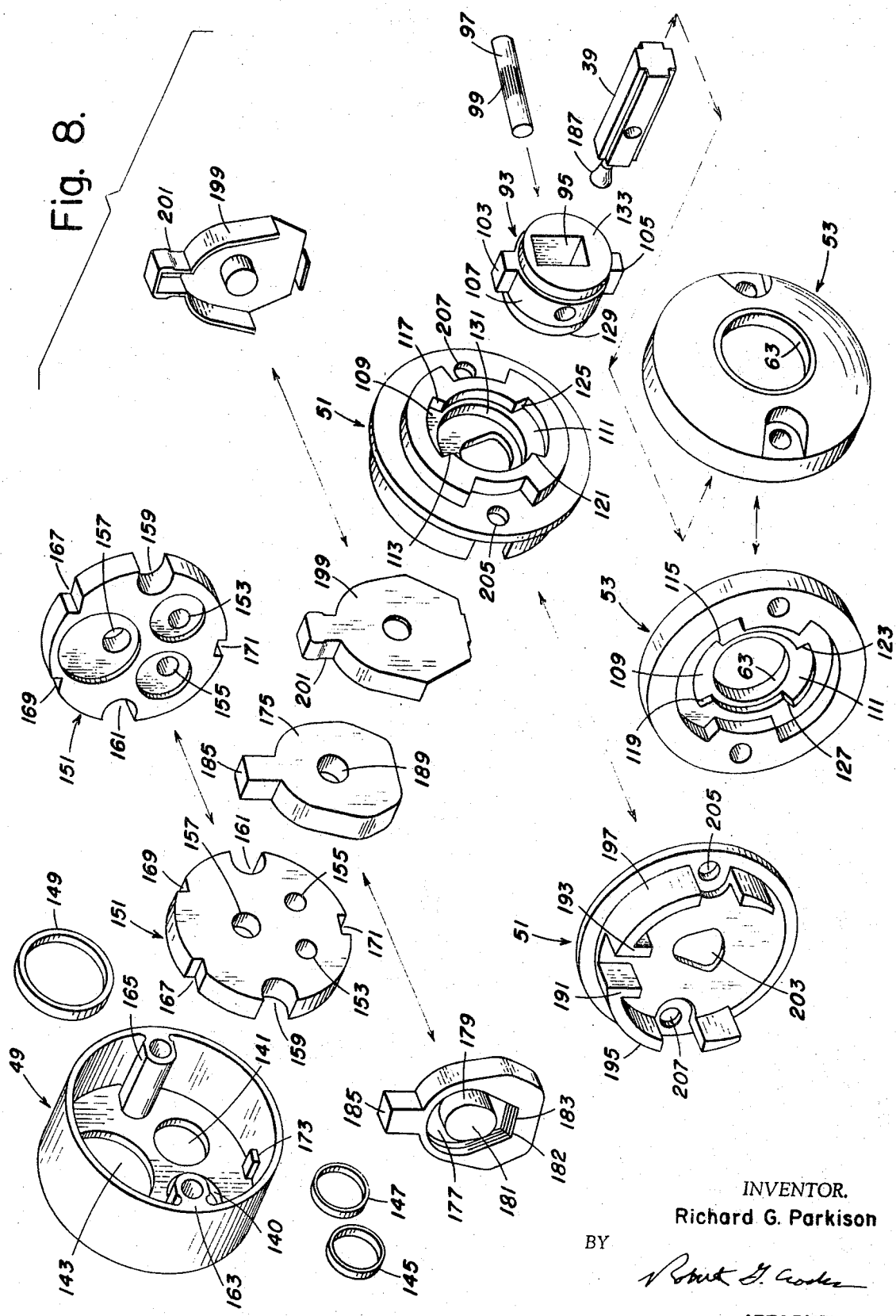
FIG. 8 is an exploded perspective view of the parts which together comprise the mixing valve.

As shown in FIG. 8 of the drawings, bearing structure 93 has a cylindrical portion 129 of reduced diameter which fits into a recess 131 in the structure of support cap 51. Furthermore, bearing structure 93 has another cylindrical portion 133 of reduced cross section which fits into passageway 63 in top cap 53. Thus, bearing structure 93 is prevented from having any relative axial motion with respect to either support cap 51 or top cap 53. Nevertheless, bearing structure 93 is permitted limited relative rotational motion with respect to support cap 51 and top cap 53. When bearing structure 93 undergoes such limited rotational motion, actuating arm 39 is correspondingly rotated about its own lengthwise axis. Therefore, actuating arm 39 is allowed to have both limited rocking motion with respect to support cap 51 and top cap 53, and also limited rotational motion with respect to support cap 51 and top cap 53. The limit which is placed on the rocking motion of actuating arm 39 with respect to bearing structure 93 is established by the slope of the inclined portion 135 of the passageway through bearing structure 93. When actuating arm 39 strikes inclined portion 135 of the passageway, its rocking motion is thereby stopped. A similar limitation is imposed by another inclined portion 137 which is formed in the lower portion of the passageway through bearing structure 93.

Valve body 49 has a lower surface 139 in which is formed the valve manifold. The valve manifold includes a pair of inlet openings 140 and 141 and an outlet opening 143. Inlet openings 140 and 141 in the valve manifold communicate respectively with openings 77 and 75 in the manifold of the faucet body. Moreover, outlet opening 143 in the valve manifold communicates with exit opening 79 in the manifold of the faucet body.

In order to seal the mating surfaces between the valve manifold and the faucet-body manifold, inlet opening 140 may carry an inlet seal ring 145, while inlet opening 141 may carry an inlet seal ring 147, and outlet opening 143 may carry an outlet seal ring 149. These seal rings extend through the surface of the mixing-valve manifold and project slightly above the inner surface of the manifold and slightly below the outer surface thereof. The inlet and outlet seal rings may be formed from some resilient and nondeteriorating substance such as Buna-N, or other synthetic rubber material.

Resting on the upper ends of inlet seal rings 145 and 147 and on the upper end of outlet seal ring 149 is a valve seat 151. The respective inlet seal rings and the outlet seal ring may fit into countersunk recesses in the lower surface of valve seat 151 in order to provide a good seal therewith.

Valve seat 151 has respective inlet ports 153 and 155 and an outlet port 157, all of which penetrate valve seat 151 from the countersunk recesses in its lower surface to its upper surface. The upper surface of valve seat 151 (as shown in FIG. 6) is the operating surface of the valve seat and is finished so as to be very smooth and flat, with the exception of the inlet ports and the outlet port which penetrate said operating surface.

Valve seat 151 may be formed from a ceramic material such as aluminum oxide which has been machined to shape and then fired to harden it. The material for the valve seat may be prepared by mixing finely powdered aluminum oxide with a small amount of organic binder material. The organic binder material enables the aluminum oxide to retain its shape sufficiently long to be machined by having inlet and outlet ports formed therein and certain other irregularities which are required around the outer edge of the valve seat. When such machining has been completed, the valve seat is fired at high temperatures, thereby driving out the organic binder, while not leaving any significant porosity within the aluminum oxide material. When the valve seat has been fired, the operating surface thereof is then lapped to give it an extremely smooth finish.

Contemporaneously with the machining of inlet ports 153 and 155 and outlet port 157 in the valve seat 151, indentations 159 and 161 may be formed in the periphery thereof at points diametrically opposite each other. Indentations 159 and 161 enable valve seat 151 to be placed within valve body 49 in such a way that it cannot be rotated therein about the axis of the valve body. Rotation of valve seat 151 is prevented by the engagement between indentation 159 of valve seat 151 and a rib 163 formed within valve body 49 and extending lengthwise thereof from the manifold surface to the open end of valve body 49. Likewise, rotation of valve seat 151 with respect to valve body 49 is also prevented by the engagement between indentation 161 in the periphery of valve seat 151 with a rib 165 formed on the inner surface of the wall of valve body 49 at a point diametrically opposite rib 163. Ribs 163 and 165 are hollow in order to permit the passage of cap screws 57 and 55 respectively therethrough to penetrate the lower surface of the manifold. Relative rotational motion between valve seat 151 and valve body 49 is also prevented by engagement of notches 167 and 169, formed at the periphery of valve seat 151, with two small ribs extending upwardly (in FIG. 6) from the inner surface of the valve manifold along the inner surface of the cylindrical wall of valve body 49. Finally, relative rotational motion between valve seat 151 and valve body 49 is still further restrained by the engagement between a notch 171 formed in the periphery of valve seat 151 and a rib 173 which extends upwardly (in FIG. 6) along the inner surface of the cylindrical wall of valve body 49. Neither the ribs which engage notches 167 and 169, nor rib 173 extends upwardly as far as the operating surface of valve seat 151.

Within valve body 49 and arranged for slidable contact with valve seat 151 is a valve plate 175, which may be formed of ceramic material in a way similar to that in which valve seat 151 is formed. It will be understood that materials other than ceramics may be used in the formation of valve seat 151 and valve plate 175. However, the hardness of ceramics, such as aluminum oxide, and the ability of such ceramics to be highly polished to an extremely smooth and flat surface militate in favor of the use of ceramic materials for this purpose. Ceramic materials do not deteriorate appreciably with time, and are so hard that very little wear takes place, even between the operating surface of valve seat 151 and the corresponding operating surface of valve plate 175.

The lower surface of valve plate 175, which bears against the operating surface of valve seat 151, contains a recess 177 which serves to control the communication between inlet ports 153 and 155 and outlet port 157 of valve seat 151. I prefer to form recess 177 in the shape of a non-circular annular "moat" surrounding a land 179 the "plateau" 181 of which is at the same level as the lower, or operating, surface of valve plate 175. The plateau 181 of land 179 is lapped smooth, concurrently with the lapping of the remainder of the operating surface of valve plate 175, whereby plateau 181 of land 179 bears against the operating surface of valve seat 151 so closely that leakage does not take place therebetween.

Within recess 177 are formed a number of steps 182 in the wall of the recess. These steps serve to change gradually the direction of water passing through recess 177, thereby helping to prevent noise attributable to said passage of water.

In forming recess 177, I prefer to have one portion which extends farther from land 179 than the remaining portions of recess 177. At that point, the periphery of the recess is straightened for a short distance as shown at 183, but the outer wall of the recess is sloped at that point and is supplied with several steps. The portion of recess 177 distant from said straightened portion has steeper walls and may be fitted with only a single step. I prefer to use a single step approximately half way up the side wall of land 179.

At the outer edge of valve plate 175 at a point opposite point 183 of recess 177, I prefer to have the peripheral surface of the valve plate extend outward to define an elongated and relatively narrow portion which I denominate as a "tail" 185. This "tail" is shown clearly in FIG. 7, which illustrates the cross section of the tail, as well as that of the remainder of valve plate 175.

In order to produce the relative sliding motion between valve plate 175 and valve seat 151, which gives the control action of the mixing valve, actuating arm 39 is equipped with a protuberance 187 at its lower extremity (as in FIG. 6), which extends into a depression 189 formed in the surface of valve plate 175 opposite the operating surface which has recess 177 formed therein. Just as recess 177 does not penetrate all the way through the valve plate, likewise depression 189 also does not penetrate all the way through the valve plate, but rather extends only part way through the valve plate and occupies a portion of the interior of land 179 formed in the valve plate. I prefer that depression 189 should be substantially cylindrical in form, although it may be considerably rounded at the inner end thereof. It would also be possible to endow depression 189 with a conical or frusto-conical surface if so desired.

When actuating arm 39 undergoes limited rocking motion, protuberance 187 of the actuating arm bears against the wall of depression 189 in valve plate 175 and moves the valve plate slidably with respect to the operating surface of valve seat 151. When actuating arm 39 undergoes rotational motion about its own lengthwise axis, valve plate 175 may or may not undergo any motion, depending upon the angular position of actuating arm 39 with respect to the axis of symmetry of the mixing valve. If the lengthwise axis of actuating arm 39 coincides with the central axis of symmetry of the mixing valve, rotation of actuating arm 39 about its own lengthwise axis produces no motion of valve plate 175 whatever. On the other hand, if the lengthwise axis of actuating arm 39 has been rocked away from the central axis of symmetry of the mixing valve, any rotation of bearing structure 93 about the central axis of symmetry of the mixing valve will cause motion of the protuberance 187 through an arcuate path with respect to the valve seat. This arcuate motion of protuberance 187 imparts to some points on valve plate 175 a corresponding arcuate motion with respect to the valve seat. However, there is one point at the end of tail 185 of valve plate 175 which does not undergo arcuate motion. The tail 185 of valve plate 175 is confined between guide members 191 and 193 which are associated with flanges 195 and 197 respectively of support cap 51. Guide members 191 and 193 present substantially planar surfaces which embrace tail 185 of valve plate 175 therebetween. Thus, the end of the tail, which has a width substantially equal to the space between the faces of guide members 191 and 193, is restricted to translational motion parallel to the faces of the respective guide members. Hence, the point at the end of tail 185 cannot undergo arcuate motion as do the remainder of the points on valve plate 175. The width of tail 185 is greatest substantially at the end of the tail. The effective width of the tail at all points other than its end is slightly reduced by a means which will be explained in succeeding paragraphs. The effect of this relative reduction of the width of the tail at points other than the end thereof is to permit a small amount of motion of these points perpendicular to the faces of guide members 191 and 193, or arcuate motion about a center at the end of the tail.

Figure 7:
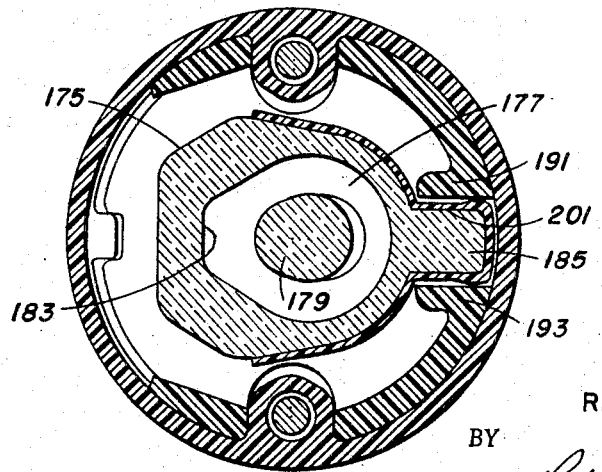
FIG. 7 is a sectional view of the mixing valve taken along a plane transverse to the axis of the mixing valve and passing through line 7-7 of FIG. 6, this view being taken in a downward direction.

When rocking motion of actuating arm 39 about pivot pin 97 causes translation of valve plate 175, the tail 185 of the valve plate moves between guide members 191 and 193 in a direction parallel to the faces thereof. In FIGS. 5, 6, and 7 of the drawings, such motion corresponds to motion in a left and right direction. Thus, if actuating arm 39 is rocked about pivot pin 97, and if bearing structure 93 is then rotated about the axis of symmetry of the mixing valve, arcuate motion of the valve plate takes place about a center at the end of tail 185. The amount of such arcuate motion is proportional to the distance from the end of the tail of the valve plate to the point on the valve plate whose arcuate motion is to be measured. In view of the fact that guide members 191 and 193 permit the end of tail 185 to undergo translational motion therebetween, the actuating arm 39 can cause the valve plate to rotate about a center point which is not fixed but which is always at the end of tail 185. In addition to serving the purpose of supporting guide members 191 and 193 respectively, flanges 195 and 197 serve the purpose of centering support cap 51 with respect to valve body 49, and helping to retain support cap 51 in position covering the end opening of valve body 49.

As will be noted from FIG. 6 of the drawings, protuberance 187 has a shape which is not quite spherical. Although the cross section of protuberance 187, looking along the lengthwise axis of actuating arm 39, is circular, a segment has been removed from the spherical portion of protuberance 187 at the end farthest from the remainder of actuating arm 39. The removed portion of the otherwise spherical portion of protuberance 187 is not necessary because it is not desired that any portion of protuberance 187 should bear against the bottom of depression 189 in valve plate 175. Rather, it is desired that protuberance 187 should bear only against the substantially cylindrical side walls of depression 189.

It will be noted that the cross section of actuating arm 39 is reduced at approximately the point where the actuating arm enters depression 189. This reduction in cross section permits rocking motion of the actuating arm without allowing the arm to strike the edges of depression 189 at its upper surface (as viewed in FIG. 6).

If the very hard ceramic material of valve plate 175 were allowed to be in contact with protuberance 187 of actuating arm 39, which may be formed of metal, it would be likely that protuberance 187 would be worn down by the abrasive action of the ceramic material. Moreover, if the metal of actuating arm 39 were in direct rubbing contact with the inner surface of depression 189 of valve plate 175, there might be binding between them. Accordingly, I prefer to supply protective means 199 which may take the form of a sheet of material covering the surface of valve plate 175 opposite the operating surface thereof, and extending into depression 189. By forming protective means 199 from some sort of plastic material having lubricating qualities, I am able to supply within depression 189 of valve plate 175 a liner having the form of a socket against the walls of which protuberance 187 of actuating arm 39 may bear. I have found that a mixture of nylon and molybdenum disulfide is admirably suited for this purpose. Such a material is marketed by Polymer Corporation, of Reading, Pennsylvania under the trademark "NYLATRON".

It has been mentioned that the effective cross-sectional width of tail 185 is greater near the end thereof than at points remote from the end. The comparatively greater width at the end of the tail may be provided by a "skirt" 201 formed from the same sheet of material which comprises protective means 199. Skirt 201 depends from the upper surface of protective means 199 and covers the side walls of tail 185 of valve plate 175. The thickness of skirt 201 is greatest at the point where it covers the side walls at the very end of tail 185. Thus, the effective width presented by the valve plate and protective means together, at the very end of tail 185, is great enough to span the gap between guide members 191 and 193. By virtue of the lubricative properties of the material used in protective means 199, the sliding motion between guide members 191 and 193, on the one hand, and the side walls of the skirt 201 covering the end of tail 185, on the other hand, is facilitated. Thus, very little stress is applied to the valve plate by guide members 191 and 193, and any likelihood of damage to the valve plate is minimized.

When tail 185 of valve plate 175 is in the position such that it is fully embraced between guide members 191 and 193, the valve is in the "off" position. The only motion permitted the end of the tail is translatory motion within the confines of the guide members. The tail is not permitted to swing in an arc about the axis of symmetry of the valve. Thus, motion of the valve plate is minimized in a position where motion would not accomplish any control function. Accordingly, space is saved within the valve cartridge by not having to provide room for such arcuate motion of the tail of the valve plate. This is one of the features which contributes to obtaining adequate flow capacity through a valve structure of optimum compactness.

It has been mentioned that guide members 191 and 193 apply very little force to the valve plate. It is now appropriate to mention that protuberance 187 of actuating arm 39 also applies a minimum of force to the valve plate which would contribute to stress within the material of the valve plate. By virtue of the fact that the cross section of protuberance 187 is round, and the further fact that it is received within a depression 189 which is also round, the protuberance does not apply torsional force to the valve plate. In some prior-art types of mixing valves, the actuating arm is keyed to the valve plate by means of a "tang" which fits in an elongated slot in the valve plate. Then, when the actuating arm is rotated about its lengthwise axis, the tang of the actuating arm forces the valve plate to undergo a corresponding rotational motion, which is resisted by frictional forces between the valve plate and the valve seat. These torsional forces apply a stress within the valve plate which is not present in the valve plate according to the present invention.

As shown in FIG. 8 of the drawings, support cap 51 has near its central point a hole 203 which provides room for passage of the actuating arm through support cap 51. Support cap 51 is also provided with holes 205 and 207 for through passage of the cap screws which retain the support cap and the top cap in position on the valve body and which also secure the valve cartridge to the manifold of the faucet body. These holes are clearly shown in that portion of FIG. 8 which illustrates the part of support cap 51 which would not be visible in the exploded view that comprises the main portion of FIG. 8. Corresponding views are shown in FIG. 8 to show these parts of top cap 53, protective means 199, valve plate 175 and valve seat 151, which would otherwise be obscured in the exploded view.

Figure 9:
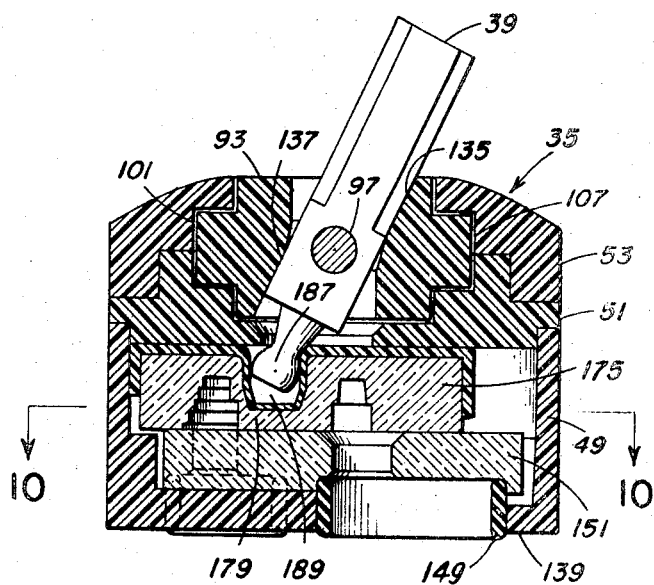
FIG. 9 is a sectional view taken through the mixing valve, similar to that of FIG. 6, except that the valve plate has been shifted to a position such that the maximum rate of flow of fluid from both inlet ports is permitted.
Figure 10:
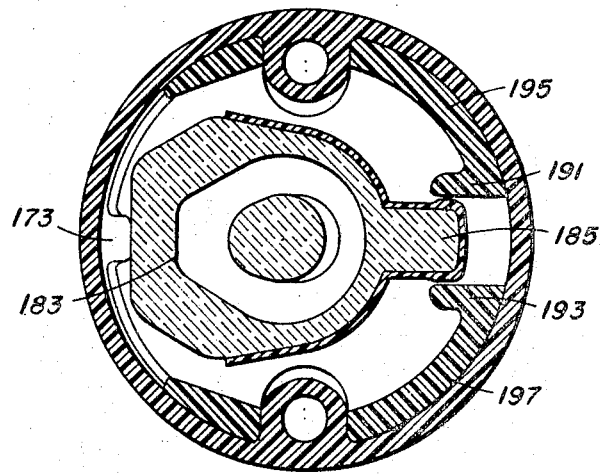
FIG. 10 is a sectional view through the valve and taken along a plane passing perpendicular to the axis of the valve through the line 10–10 of FIG. 9 while looking downward.
Figure 11:
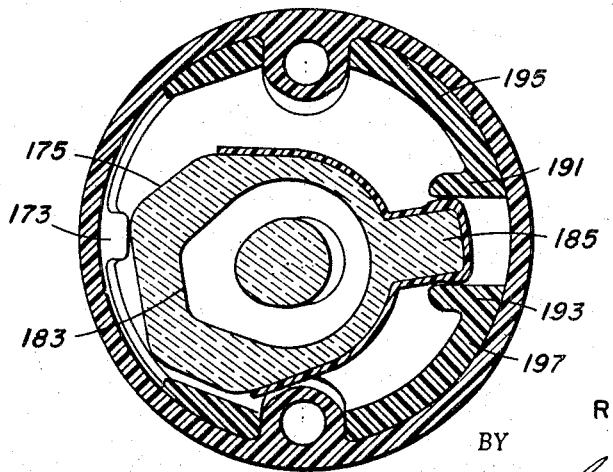
FIG. 11 is a sectional view similar to that of FIG. 10 but in which the valve plate has been shifted to a position such that full flow of fluid is permitted from one inlet port, while no flow of fluid is permitted from the other inlet port.

Turning now to FIGS. 9 through 11 of the drawings, it will be noted that FIGS. 9 and 10 show the valve in a position of maximum flow of fluid, equally balanced as to flow from the two input sources. FIG. 11, on the other hand, shows the valve in such a position that one of the input ports is fully open, while the other input port is completely closed. The change from one position to the other is achieved by rotation of bearing structure 93 about the axis of symmetry of the valve while actuating arm 39 is in its position of maximum angular departure from the axis of symmetry of the valve. Rotational motion of the bearing structure, while maintaining the actuating arm in its fully "rocked" position, can change the valve from a "fully hot" position to a "fully cold" position or vice versa, depending upon the relative connections of the sources of hot and cold water. It is important to note that arcuate motion of the valve plate about its movable center point at the end of tail 185 is achieved without having the valve plate strike ribs 163, 165 and 173 of the valve body, which are formed in the inner surface of the wall of the valve body. The valve plate does not strike rib 173 because that rib does not extend upwardly as far as the operating surface of the valve plate. The valve plate does not strike ribs 163 and 165 because its motion toward these ribs is limited by virtue of the limited motion of bearing structure 93. The ears of the bearing structure engage the stops in the support cap and top cap before the valve plate can strike either of ribs 163 and 165.

To summarize the motion which occurs during operation of the mixing valve, I prefer to mount the valve in such a position that actuating arm 39 is vertical when the valve is turned off, and forwardly extending portion 45 of the handle extends toward the operator. In this position, the operator can move the handle from left to right without moving the valve plate and without turning on any water. Thus, the faucet remains in the "off" position while the end of the handle traces out an arc in a substantially horizontal plane.

When the forwardly extending handle is lifted, the water is turned on. The further the handle is lifted, the greater becomes the flow of water through the valve. If the inlet openings of the valve are connected to hot and cold water supplies respectively, motion of the handle to the left and right then determines the temperature of the mixture of water emanating from the faucet. In the "full-on" position, motion of the handle from left to right then adjusts the faucet between full hot and full cold positions. Thus, the locus of points which can be traced out by the end of the forwardly extending portion of the handle is approximately a spherical rectangle, that is to say, a curvilinear quadrilateral figure traced on the surface of a sphere.

As has been mentioned, when the valve is turned on, the inlet ports of the valve seat are uncovered at the same time the outlet port is uncovered. Thus, water entering the recess 177 in the valve plate from the inlet ports is still somewhat restrained from passing through the outlet port, depending upon the degree to which the outlet port is uncovered. As the inlet ports are gradually uncovered, the outlet port is also gradually uncovered, thus providing adequate cross section for outflow of water while still not permitting unrestrained flow of water into a zone of very low pressure. This arrangement contributes to quietness of the valve, and makes possible the achievement of a much quieter valve than has been realized in the prior art.

It will now be understood that I have provided a mixing valve, and a faucet for incorporating such a mixing valve, which are quiet in operation, and which are highly resistant to damage attributable to operation of the valve. I have also provided a valve and faucet which are highly resistant to externally caused damage and which are not likely to become fouled by foreign substances. Finally, I have provided a valve which makes optimum use of the space within its cartridge in order to achieve a maximum range of flow rates in a minimum volume of valve cartridge. Many variations can be made in the materials and proportions of the components of the faucet and valve of my invention. Such variations can be made without departing from the principles of my invention. Accordingly, I do not wish to be limited to the precise details of the disclosure set forth in the foregoing paragraphs. Rather, I intend to be limited only by the terms of the series of claims which are appended to this disclosure.

I claim:
1. A mixing valve comprising:
  a. a valve body having an opening in a first end thereof and a plurality of openings in a second end thereof, said plurality of openings in said second end including a pair of inlet openings and an outlet opening for communication with corresponding respective openings in the structure of a mixing-faucet body;
  b. a valve seat supported within said valve body and having ports corresponding respectively to said plurality of openings in said second end of said valve body, said valve seat having an operating surface which, with the exception of said ports, is smooth;
  c. a valve plate within said valve body and having an operating surface disposed for slidable contact with said operating surface of said valve seat, said valve plate having a recess formed in the operating surface thereof, said valve plate having a tail which extends outwardly from one edge thereof, said operating surface of said valve plate being smooth except for the presence of said recess therein, and said valve plate having a depression formed in the surface thereof opposite said operating surface;
  d. cap structure covering said opening in said first end of said valve body and having at least one hole therethrough;
  e. bearing structure carried by said cap structure and so disposed as to allow limited relative rotational motion between said bearing structure and said cap structure;
  f. valve-actuating means carried by said bearing structure and arranged to pass through said hole in said cap structure, one end of said valve-actuating means extending into said depression in said surface of said valve plate opposite said operating surface thereof, said valve-actuating means being arranged for limited rocking motion with respect to said bearing structure; and
  g. guide means carried by said valve body and embracing at least a portion of said tail of said valve plate to permit sliding motion between portions of said guide means and said tail.

2. A mixing valve in accordance with claim 1 in which said cap structure provides a race for the accommodation of said bearing structure.

3. A mixing valve in accordance with claim 1 in which said bearing structure includes a pivot pin for passing through said valve-actuating means to provide a center for said limited rocking motion between said bearing structure and said valve-actuating means.

4. A mixing valve in accordance with claim 1 in which said cap structure includes a top cap and a support cap which cooperate to define a race for accommodation of said bearing structure.

5. A mixing valve in accordance with claim 1 in which a land is formed within said recess in said operating surface of said valve plate.

6. A mixing valve in accordance with claim 5 in which the top surface of said land is smooth to permit sliding contact between said top surface of said land and said operating surface of said valve seat.

7. A mixing valve in accordance with claim 1 in which said depression in said surface of said valve plate opposite said operating surface thereof is substantially round in cross section.

8. A mixing valve in accordance with claim 1 in which said end of said valve-actuating means extending into said depression in said surface of said valve plate opposite said operating surface thereof has a cross section characterized by substantially circular symmetry.

9. A mixing valve in accordance with claim 1 in which said recess in said operating surface of said valve plate has stepped edges.

10. A mixing valve in accordance with claim 5 in which the sides of said land have a stepped configuration.

11. A mixing valve comprising:
 a. a valve body having a plurality of openings at one end thereof and including a cap structure at the other end thereof, said cap structure having a hole therethrough;
 b. a valve seat supported within said valve body and having a plurality of ports corresponding respectively to said openings in said valve body and communicating with said respective openings in said valve body, said valve seat having an operating surface facing away from said openings in said valve body;
 c. a valve plate within said valve body and having an operating surface disposed for sliding contact with the operating surface of said valve seat, said valve plate having a recess formed in the operating surface thereof and a depression formed in the surface thereof opposite said operating surface, said valve plate having a tail extending outwardly from one edge thereof;
 d. protective means applied to said surface of said valve plate opposite said operating surface thereof and extending into said depression formed in said surface thereof opposite said operating surface, said protective means also having a depression on the side thereof remote from said valve plate;
 e. bearing structure carried by said cap structure and disposed for limited rotational displacement between said bearing structure and said cap structure;
 f. valve-actuating means carried by said bearing structure and arranged to extend through said hole through said cap structure, one end of said valve-actuating means extending into said depression in said protective means, said valve-actuating means being supported for limited rocking motion with respect to said bearing structure; and
 g. guide means carried by said valve body and adapted to limit the motion of the end of said tail of said valve plate.

12. A mixing valve in accordance with claim 11 in which said protective means covers at least part of the side surface of said tail of said valve plate between said operating surface and said surface opposite said operating surface.

13. A mixing valve in accordance with claim 12 in which said protective means covering at least part of said side surface of said tail of said valve plate is disposed for sliding contact with said guide means, whereby said motion of said tail of said valve plate is limited by force applied by said guide means through said protective means.

14. A mixing valve in accordance with claim 11 in which said guide means presents a pair of substantially parallel surfaces between which motion of said end of said tail of said valve plate takes place.

15. A mixing valve in accordance with claim 12 in which the thickness of said protective means covering at least part of the side surface of said tail of said valve plate is greater near the end of said tail of said valve plate than remote from said end of said tail of said valve plate.

16. A mixing valve in accordance with claim 11 in which said openings in said one end of said valve body have cross sections greater than the respective cross sections of the respective ports in said valve seat corresponding thereto.

17. A mixing valve in accordance with claim 11 in which said valve seat is supported movably within said valve body to permit said valve seat to be pressed against said valve plate so that the respective operating surfaces of said valve seat and of said valve plate are in firm contact with each other even during relative sliding motion between said valve seat and said valve plate.

18. A mixing valve in accordance with claim 11 in which said valve seat and said valve plate are formed of ceramic material.

19. A mixing valve in accordance with claim 11 in which said protective means is formed of plastic material.

20. A mixing valve in accordance with claim 11 in which said protective means is formed of plastic material admixed with a lubricant.

21. A mixing valve in accordance with claim 11 in which said openings in said valve body carry sealing means for preventing leakage between said valve body and the surface of said valve seat remote from said operating surface thereof.

22. A mixing valve in accordance with claim 11 in which said valve-actuating means includes a handle at the end of said means outside said valve body.

23. A mixing valve in accordance with claim 11 in which said cap structure includes a top cap and a support cap which cooperate to define a race for guiding said bearing structure while permitting limited relative rotational motion between said bearing structure and said cap structure.

24. A mixing valve in accordance with claim 23 in which said race has stops and said bearing structure has ears for cooperating with said stops to limit the relative rotational motion between said bearing structure and said cap structure.

25. A mixing valve in accordance with claim 11 in which said ports in said valve seat are substantially round in cross section.

26. A mixing valve in accordance with claim 1 in which said slidable contact between the respective operating surfaces of said valve plate and said valve seat positions said valve plate so that said recess formed in the operating surface of said valve plate controls the relative cross-sectional areas of the paths from the respective inlet openings in said valve body through ports in said valve seat and thence into said recess and back through another port in said valve seat to said outlet opening in said valve body.

27. A mixing valve in accordance with claim 11 in which the cross section of said valve-actuating means is reduced at approximately the point where it enters said depression and in which the cross section of said valve-actuating means is greater within said depression than at said point of reduced cross section, whereby the portion of said valve-actuating means characterized by greater cross section bears against the walls of said depression.

28. A mixing valve in accordance with claim 11 in which the end of said valve-actuating means within said depression has substantially the shape of a sphere from which a segment has been removed at its extremity and which is joined to the remainder of the valve-actuating means by a smooth fillet at a point on said sphere diametrically opposed to the extremity where said segment has been removed.

29. A faucet of the single-lever type for controlling by means of a single handle the total rate of flow of fluid from two sources to a single output point and the relative rates of flow of fluid from said two respective sources to said single output point, said faucet comprising:
 a. a faucet body for connection to said two respective sources and having output means; and
 b. a mixing-valve cartridge associated with said faucet body and adapted to receive through said faucet body fluid from both of said respective sources and to deliver back to said faucet body a controlled volume of fluid of any desired ratio of volumes derived from said respective sources, said mixing-valve cartridge comprising:
  i. a valve body having openings at one end for receiving fluid through said faucet body from said respective sources and for delivering controlled fluid back to said faucet body, said valve body having cap structure at its other end, said cap structure having a passageway;
  ii. a valve seat supported within said valve body and having a plurality of ports for communication with said openings in said valve body, and said valve seat having an operating surface facing away from said openings in said valve body;
  iii. a valve plate within said valve body and having an operating surface facing the operating surface of said valve seat for slidable contact therewith, said valve plate having control means opening through said operating surface of said valve plate and a depression opening through the surface thereof opposite said operating surface, said valve plate having an elongated and relatively narrow portion extending outwardly from one edge thereof;

iv. bearing structure supported by said cap structure for limited rotational motion of said bearing structure with respect to said cap structure;

v. valve-actuating means carried by said bearing structure and penetrating said passageway in said cap structure, one end of said valve-actuating means cooperating with said depression in said valve plate, said valve-actuating means being supported for limited rocking motion with respect to said bearing structure;

vi. means for preventing said valve-actuating means and said valve plate from causing excessive damage to each other; and vii. guide means carried by said valve body and adapted to limit the path of motion of the end of said elongated and relatively narrow portion of said valve plate during said slidable contact between said valve plate and said valve seat.

30. A faucet in accordance with claim 29 additionally including a decorative escutcheon removably attached to said faucet body and substantially covering said mixing-valve cartridge.

31. A faucet in accordance with claim 30 in which said valve-actuating means includes a handle which is removable to permit its installation after said decorative escutcheon has been placed on said faucet body over said mixing-valve cartridge.

32. A faucet in accordance with claim 29 in which said mixing-valve cartridge is removably attached to said faucet body for easy repair and replacement.

33. A faucet in accordance with claim 29 in which said mixing-valve cartridge includes means interposed between said cap structure and said valve plate for facilitating relative sliding motion therebetween and in which force applied to said valve seat and said valve plate by pressure of said fluid is transmitted to said cap structure through said last-named means.

34. A faucet in accordance with claim 31 in which said handle, when installed, extends in a direction substantially perpendicular to the remainder of said valve-actuating means to permit rotation of said remainder of said valve-actuating means about its lengthwise axis.

35. A faucet in accordance with claim 29 in which said guide means comprises a pair of guide members having a zone therebetween for reception of said elongated and relatively narrow portion of said valve plate.

36. A faucet in accordance with claim 35 in which said control means of said valve plate is arranged to prevent fluid from flowing from both of said sources to said output means when said valve plate is positioned so that said elongated and relatively narrow portion of said valve plate lies entirely in said zone between said pair of guide members.

37. A faucet in accordance with claim 35 in which said valve-actuating means is rotatable about an axis lengthwise of said valve-actuating means, said depression in said valve plate being located in said valve plate in such a way that rotation of said valve-actuating means about said axis produces no motion of said valve plate if, and only if, said valve plate is positioned so that said elongated and relatively narrow portion of said valve plate lies entirely in said zone between said pair of guide members.

38. A faucet in accordance with claim 35 further including a knob having knurled irregularities arranged around a circle lying in a plane substantially perpendicular to an axis lengthwise of said valve-actuating means, said knob being rotatable about said axis without producing motion of said valve plate if, and only if, said valve plate is positioned so that said elongated and relatively narrow portion of said valve plate lies entirely in said zone between said pair of guide members.